United States Patent [19]

Eberle

[11] Patent Number: 5,685,051
[45] Date of Patent: Nov. 11, 1997

[54] METHOD AND APPARATUS FOR ALIGNING BATTERY LUGS

[75] Inventor: Kelly L. Eberle, Irving, Tex.

[73] Assignee: Eberle Engineering Co., Inc., Euless, Tex.

[21] Appl. No.: 652,420

[22] Filed: May 23, 1996

[51] Int. Cl.⁶ ................................................. B23B 11/00
[52] U.S. Cl. ..................... 29/34 R; 29/564.7; 29/566.1; 29/730
[58] Field of Search ................................... 29/730, 623.1, 29/564.7, 564.8, 566.1, 34 R, 2; 140/93 D; 219/78.16

[56] References Cited

U.S. PATENT DOCUMENTS

| | | | |
|---|---|---|---|
| 4,013,864 | 3/1977 | Tiegel et al. | 219/80 |
| 4,016,638 | 4/1977 | Klein | 29/730 |
| 4,102,034 | 7/1978 | Ott | 29/565 |
| 4,306,355 | 12/1981 | Hawrylo et al. | 29/623.2 |
| 4,349,959 | 9/1982 | Urban | 29/730 |
| 4,429,208 | 1/1984 | Eberle | 219/78.16 |
| 4,485,959 | 12/1984 | Orlando et al. | 29/623.1 |
| 4,903,519 | 2/1990 | Hukkanen et al. | 29/623.1 |
| 5,123,160 | 6/1992 | Hopwood | 29/730 |
| 5,505,744 | 4/1996 | Eberle et al. | 29/623.4 |
| 5,524,332 | 6/1996 | Krause | 29/564.7 |
| 5,578,397 | 11/1996 | Verhoog et al. | 29/2 |

*Primary Examiner*—Daniel W. Howell
*Assistant Examiner*—Christopher Kirkman
*Attorney, Agent, or Firm*—W. J. Scherback

[57] ABSTRACT

Apparatus and method to prepare battery plate lugs for use with automated machines for cast on operations. The apparatus comprises an anvil having top and opposite side walls for receiving a battery cell including a plurality of plates with lugs attached thereto. The tops of the plates are placed over the top of the anvil with the lugs positioned along the sides of the anvil and in contact therewith. A pair of rams on opposite sides of the anvil are moved inward to engage and partially flatten the lugs to render the lugs thinner and to remove whatever oxides have been formed on the surfaces of the lugs. A pair of knives on opposite sides of the anvil are moved inwardly to cut the lengths of the lugs to a uniform size.

7 Claims, 5 Drawing Sheets

METHOD AND APPARATUS FOR ALIGNING BATTERY LUGS

BACKGROUND OF THE INVENTION

1. Field of the Invention

This invention relates to method and apparatus for aligning lugs of battery plates of recombinant batteries and preparing the lugs for subsequent manufacturing operations.

2. Discussion of the Prior Art

Recombinant batteries are a class of batteries in which the electrolyte is wholly absorbed by the plate separators thus permitting the batteries to be oriented in any position. These batteries, in the main, are of small size. However during manufacture of the plates the plate lugs formed are inordinately large. Ideally in the formation of straps and terminals on the lugs the lugs would be immersed in a mold filled with molten lead. In order to form a good bond to each strap the lugs should at least partially melt. However due to the large or thick size of the lugs, when the lugs are immersed in the molten lead heat is withdrawn from the lead preventing the lugs properly to bond to the strap. Therefore, in order to form a bond between the lugs and the strap it has been necessary to pour molten lead over the lugs. This operation is costly and labor intensive. Accordingly, there exists a need, satisfied by the present invention, to provide method and apparatus to modify the lugs to enable the use of automated machines to cast onto the lugs straps and terminals.

In view of the foregoing it is an object of the present invention to prepare the lugs for use with automated machines to cast on straps and terminals.

It is a further object of the present invention to provide apparatus properly to prepare the lugs for use with automated machines to cast on straps and terminals.

SUMMARY OF THE INVENTION

I accordance with the present invention, there is provided an apparatus and method to prepare battery plate lugs for use with automated machines for cast on operations. The apparatus comprises an anvil having a top and opposite side walls for receiving a battery cell including a plurality of plates with lugs attached thereto. The tops of the plates are placed over the top of the anvil and the lugs positioned along the sides of the anvil and in engagement therewith. A pair of rams on opposite sides of the anvil are moved inward to engage and partially flatten the lugs to render the lugs thinner and to remove whatever oxides are formed on the surfaces of the lugs. A pair of knives on opposite sides of the anvil are moved inwardly to cut the lengths of the lugs to a uniform size.

DETAILED DESCRIPTION

Figure 1:
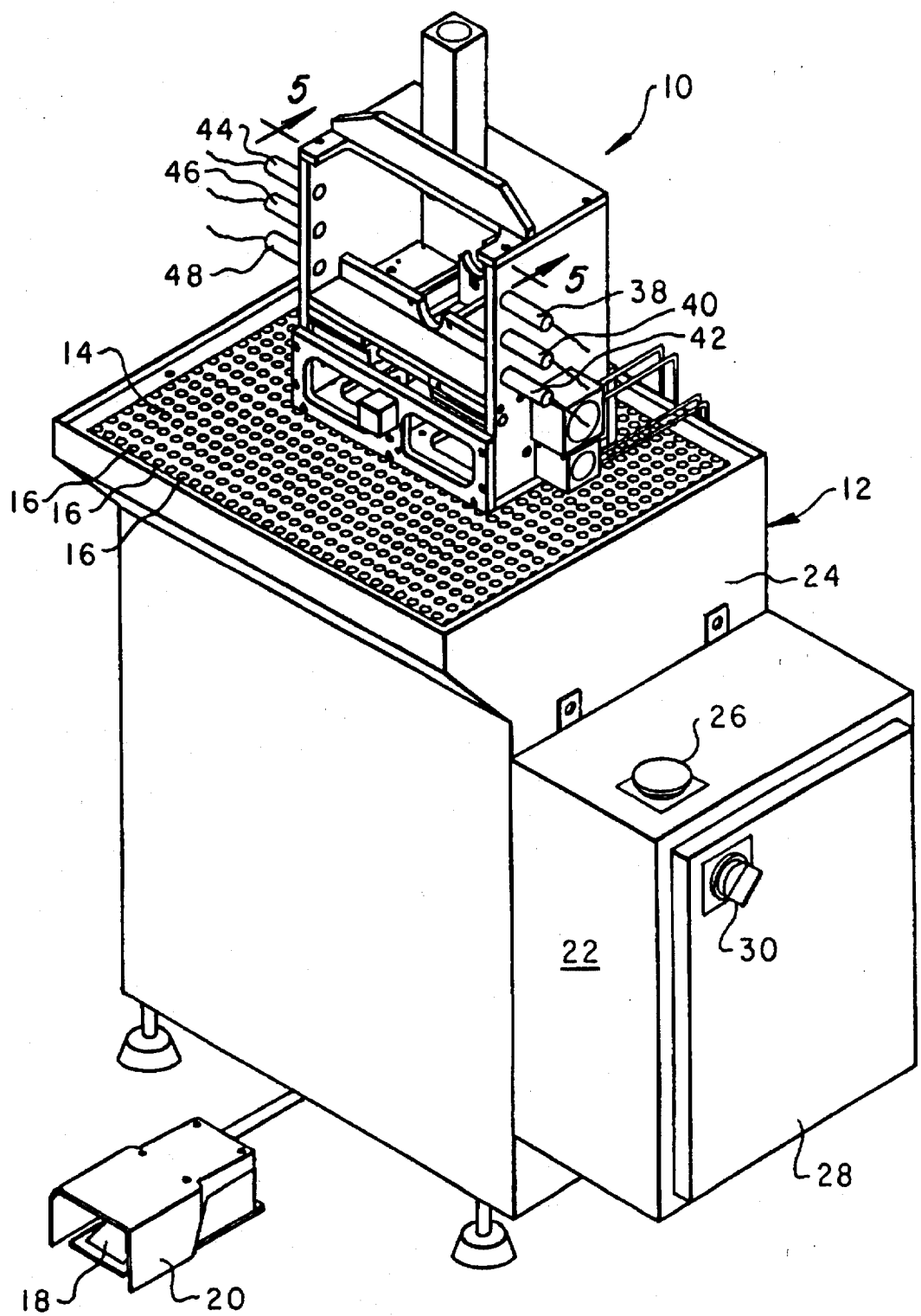
FIG. 1 is a perspective view illustrating a front of the alignment apparatus of the present invention supported on a cabinet.
Figure 2:
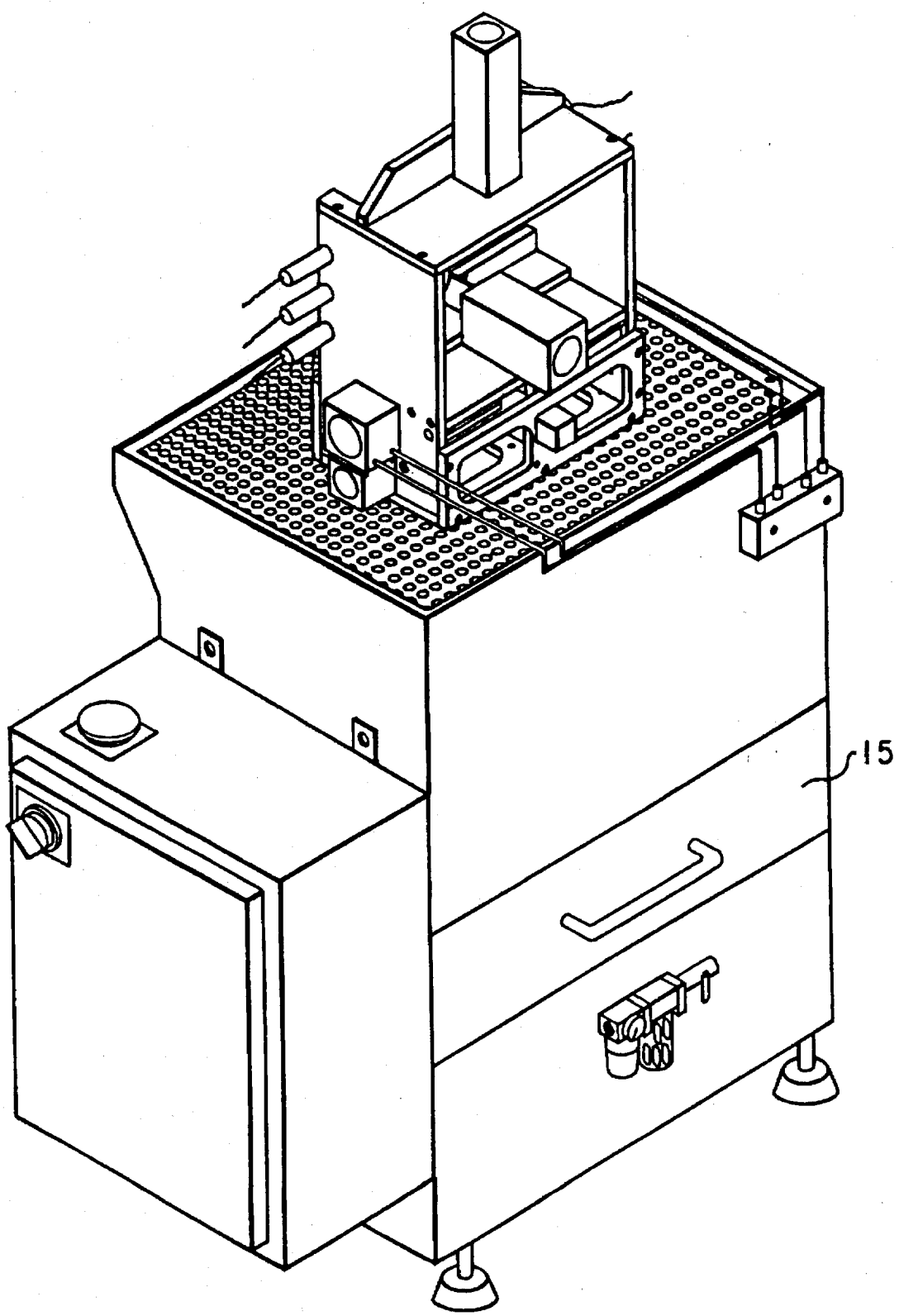
FIG. 2 is a perspective view illustrating a back portion of the alignment apparatus of the present invention supported on a cabinet.

Referring now to the drawing and particularly to FIGS. 1 and 2, reference character 10 identifies the battery plate alignment and plate lug treatment apparatus of the present invention. The apparatus 10 is supported on a cabinet 12 whose upper surface 14 is perforated by many apertures 16 to receive lead debris produced as the battery plates are being treated by the apparatus 10. The underside of surface 14 maybe connected to a suitable system (not shown) to apply a partial vacuum to the plate to withdraw the debris and thus avoid harm to an operator through inhalation of the debris, usually in the form of lead dust. In the alternative a tray 15 is provided to catch the debris as it falls by gravity through the apertures 16.

The apparatus 10 is operated by a foot actuated switch 18 protected by cover 20 to avoid inadvertent operation of the apparatus 10. The operation is under control of a programmable controller, which may be of any suitable type available in the market today, contained in electrical box 22 mounted to a side wall 24 of the cabinet 12. A suitable controller is the P.C. 501 available from the Allen Bradley Company. The controller is energized by way of push button switch 26 mounted atop the box 22. Access to the controller is by way of a door 28 secured by lock 30 in order to perform programming instructions.

Figure 3:
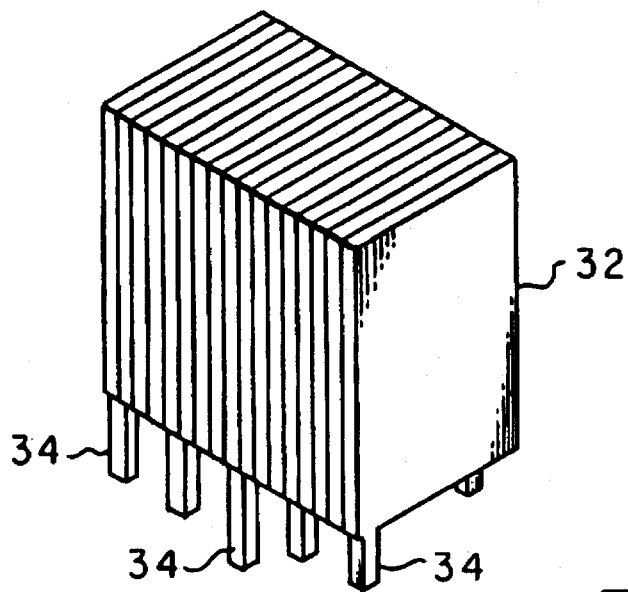
FIG. 3 illustrates a stack of battery plates after alignment and prior to treatment of the lugs.
Figure 5:
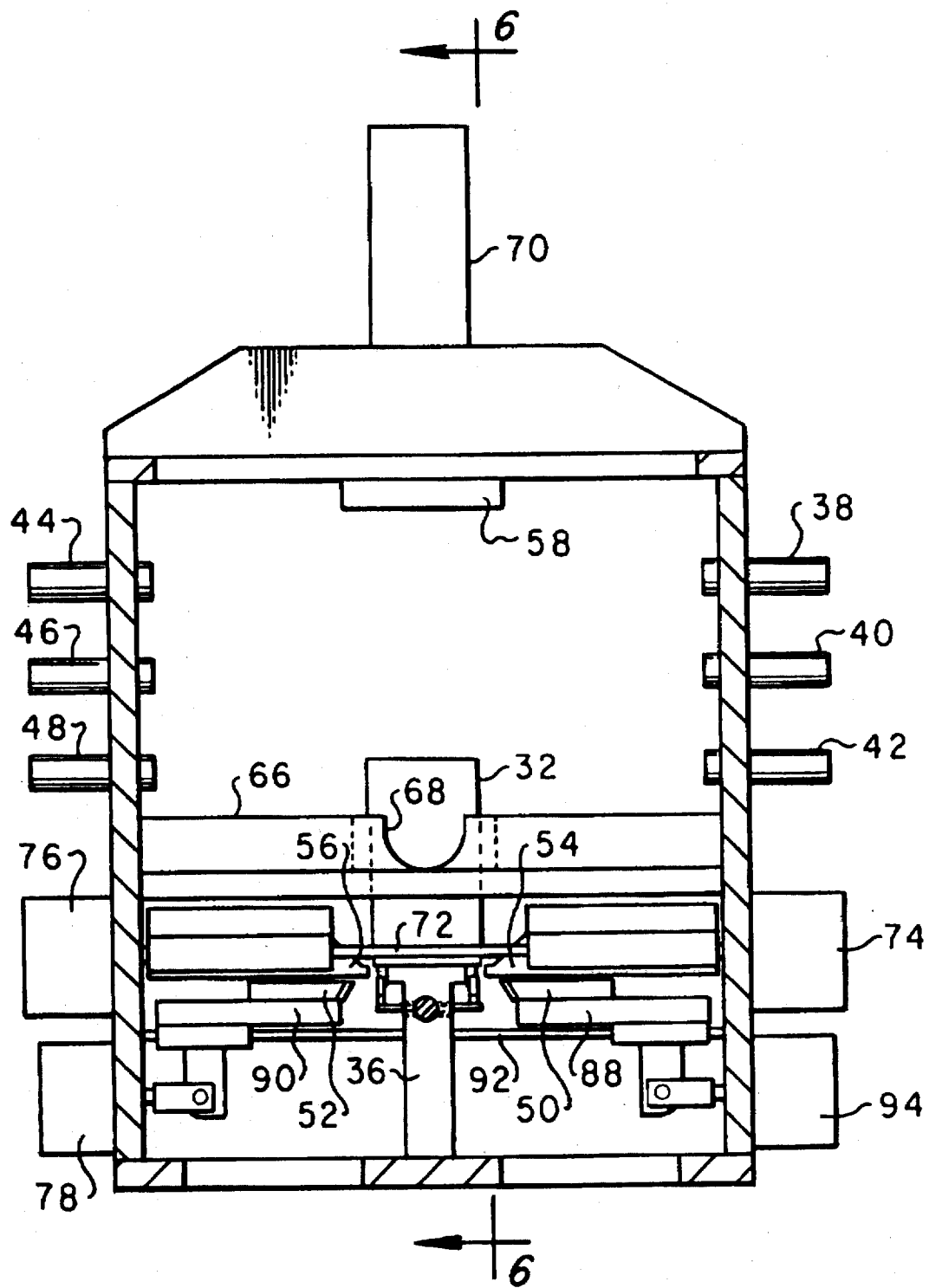
FIG. 5 is a cross-section of the alignment apparatus taken along line 5—5 of FIG. 1.

A stack of battery plates 32 (FIG. 3) are placed manually with their lugs 34 down upon an anvil or rest up 36 (FIG. 5). To avoid injury to an operator should his hand be in position placing the stack of plates in the apparatus or removing it from the apparatus, there is provided an electric eye system. The electric eye system is comprised of three light beam producing elements 38, 40 and 42 and three sensors 44, 46 and 48. When a light beam from any of the producing elements 38, 40 or 42 is interrupted, the affected sensor 44, 46 or 48 sends a signal to the programmable controller to return all moveable elements in the apparatus to a home position thus avoiding possible injury to the operator.

All moveable elements within the apparatus 10 are hydraulically or pneumatically operated. The elements include knives 50 and 52, crimpers 54 and 56, top battery plate aligner 58, side battery plate aligner 60 (FIG. 6) and end lug bending elements 62 and 64.

Figure 6:
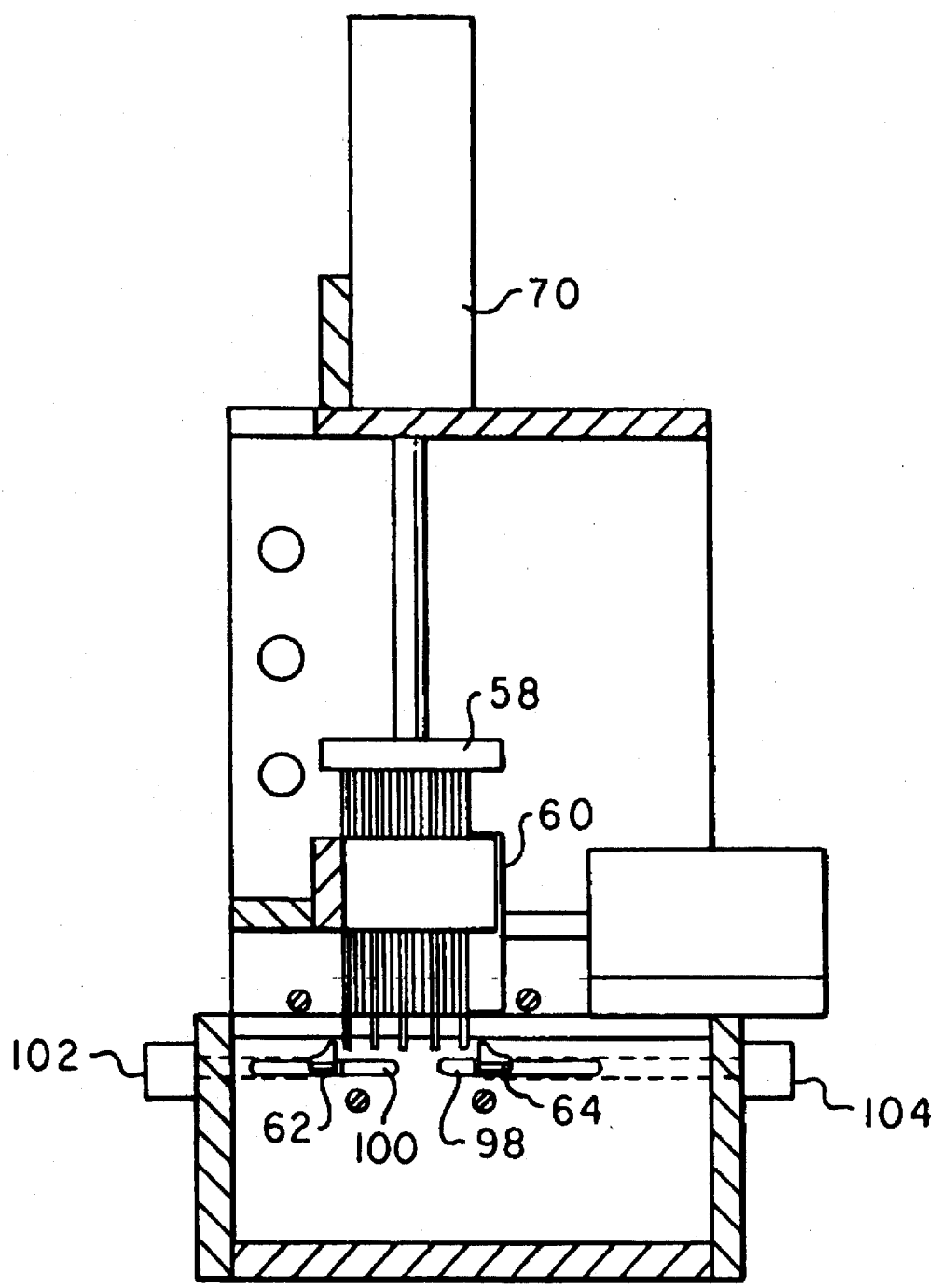
FIG. 6 is a cross-section of the alignment apparatus taken along line 6—6 of FIG. 5.

Transverse plate 66 is relieved at 68 to enable the operator to place by hand a stack of plates 32 in position over the anvil 36. With the stack in position, the top battery plate aligner 58 is moved down by pneumatic piston 70 to the position shown in FIG. 6 whereby the plates in the stack are moved against the anvil 36 such that the tops of the plates are in one plate. The side battery plate aligner is moved inward, as shown in FIG. 6, to force the battery plates together and to hold them in that position for subsequent operations.

Crimpers 54 and 56 are mounted for movement along guide rods, only one, guide rod 72 being shown. The other guide rod is located inward of and parallel to the guide rod 72. The crimpers 54 and 56 are moved along the guide rods, respectively by hydraulic pistons 74 and 76 which derive hydraulic pressure by way of conduits 78, 80, 82 and 84 under control of valve mechanism 86 all as shown in FIG. 2. The crimpers 54 and 56 are driven inwardly to engage the battery plate lugs 34 and force them against sides of the anvil 36. Sufficient force is applied by the hydraulic pistons to flatten the lugs to reduce their thickness and thus prepare them for operations with apparatus for casting straps and terminals on the lugs. Such apparatus is of the type described in U.S. Pat. No. 5,505,744 issued Apr. 9, 1996. The result of the operation by the crimpers 54 and 56 is illustrated as lugs 34A in FIG. 4.

A benefit realized by the crimping operation is the removal of oxides on the lugs thus providing clean, oxide free surfaces rendering the lugs in condition for the addition of straps and terminals as provided by apparatus of the above named U.S. Patent.

The knives 50 and 52 are utilized to cut the lengths of the lugs such that the lugs are all of uniform length. The knives 50 and 52 are respectively mounted on structures 88 and 90 in turn mounted for movement on guide rods, only guide rod 92 being illustrated. The second guide rod is located parallel with and spaced from the guide rod 92. The structures 88 and 90, and thus the knives 50 and 52 are moved along the guide rods respectively by hydraulic pistons 94 and 96 to sever the ends of the flattened lugs such that all the lugs are of the same length as illustrated by the lugs 34A in FIG. 4.

Figure 4:
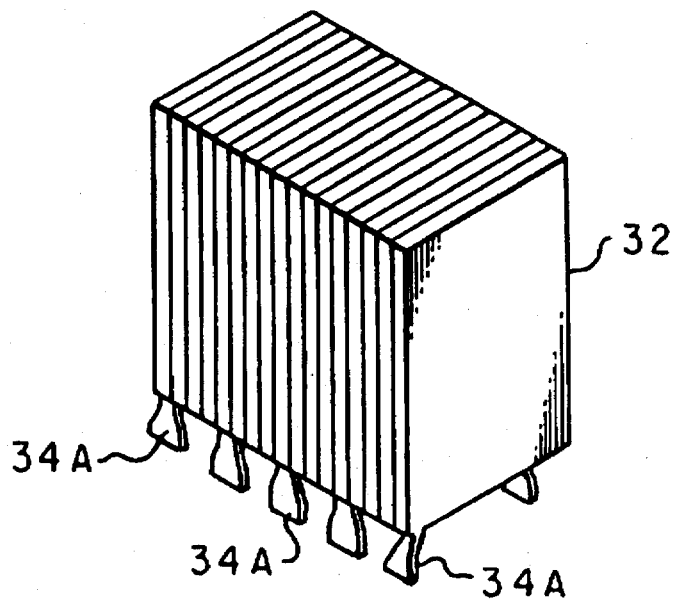
FIG. 4 illustrates the aligned stack of battery plates shown in FIG. 3 after treatment of the battery lugs utilizing the present invention.

Lug bending elements 62 and 64, FIG. 6, operate on two end negative lugs to bend them inward about 10 degrees and thus facilitate the insertion of the stack of battery plates into suitable cases. The elements 62 and 64 ride in guide slots 98 and 100, driven inward to engage and to bend the two end lugs, respectively, by pneumatic or hydraulic pistons 102 and 104. The end result of all the operations by the apparatus 10 is shown in FIG. 4.

Now that the invention has been described, modifications will occur to those skilled in the art and it is intended to cover such modifications which fall within the scope of the appended claims.

What is claimed is:

1. Apparatus for preparing battery plate lugs for use with automated cast on machines comprising an anvil having a top and two opposite and parallel side walls for receiving a battery cell including a plurality of plates with lugs attached thereto and the lugs in contact with said side walls, a pair of rams on opposite sides of said anvil moveable inwardly to engage and at least partially flatten the lugs to reduce their thickness and to remove oxides from the surfaces of the lugs, and a pair of knives on opposite sides of the anvil and moveable inwardly to cut the lengths of the lugs to the same size.

2. The apparatus of claim 1 including additional rams moveable in a direction transverse to the direction of movement of said first mentioned rams to engage end lugs of a stack of said plates and to bend them inwardly about 10 degrees to facilitate the insertion of the stack into a battery case.

3. The apparatus of claim 1 including a top battery plate aligner moveable downwardly to force the battery plates against said top wall of said anvil such that the tops of the battery plates are in one plane.

4. The apparatus of claim 3 including a side battery plate aligner moveable inwardly to force the battery plates together and to hold them in position for crimping and cutting of the lugs.

5. The apparatus of claim 1 including a programmable controller programmed to control the operation of said rams and said knives.

6. The apparatus of claim 1, in which a perforated surface is provided to support said apparatus and to permit debris from operation of the rams and said knives to fall through to a collection site.

7. The apparatus of claim 1 including an electric eye system having light beam producing elements and light sensors for controlling the return of all moveable elements to a home position whenever any of the light beams is interrupted.

* * * * *